US008697976B2

(12) United States Patent
Maruyama

(10) Patent No.: US 8,697,976 B2
(45) Date of Patent: Apr. 15, 2014

(54) PARAMETER SETTING APPARATUS HAVING SEPARATE OPERATORS FOR COURSE AND FINE ADJUSTMENTS FOR THE SAME PARAMETER

(75) Inventor: Tsuyoshi Maruyama, Hamamatsu (JP)

(73) Assignee: Yamaha Corporation (JP)

(*) Notice: Subject to any disclaimer, the term of this patent is extended or adjusted under 35 U.S.C. 154(b) by 145 days.

(21) Appl. No.: 12/511,967

(22) Filed: Jul. 29, 2009

(65) Prior Publication Data

US 2010/0024628 A1 Feb. 4, 2010

(30) Foreign Application Priority Data

Jul. 30, 2008 (JP) ................................ 2008-196236
Jul. 30, 2008 (JP) ................................ 2008-196237

(51) Int. Cl.
*G01P 3/00* (2006.01)

(52) U.S. Cl.
USPC ............................................ 84/615; 84/626

(58) Field of Classification Search
USPC ........................................................ 84/615
See application file for complete search history.

(56) References Cited

U.S. PATENT DOCUMENTS

| | | | | |
|---|---|---|---|---|
| 4,915,007 | A * | 4/1990 | Wachi et al. | 84/622 |
| 5,260,508 | A * | 11/1993 | Bruti et al. | 84/622 |
| 5,288,941 | A * | 2/1994 | Sekizuka | 84/615 |
| 6,452,612 | B1 * | 9/2002 | Holtz et al. | 715/723 |
| 6,576,824 | B2 * | 6/2003 | Ishibashi et al. | 84/477 R |
| 6,747,678 | B1 * | 6/2004 | Katayama et al. | 715/773 |
| 6,754,351 | B1 * | 6/2004 | Tanji | 381/61 |
| 7,080,324 | B1 | 7/2006 | Nelson et al. | |
| 2002/0188364 | A1 * | 12/2002 | Ota et al. | 700/94 |
| 2003/0091329 | A1 * | 5/2003 | Nakata et al. | 386/52 |
| 2005/0055117 | A1 * | 3/2005 | Holton | 700/94 |
| 2005/0092163 | A1 * | 5/2005 | Aiso et al. | 84/625 |
| 2006/0232586 | A1 * | 10/2006 | Terada | 345/440 |
| 2008/0018594 | A1 | 1/2008 | Ohta et al. | |
| 2008/0080720 | A1 * | 4/2008 | Jacob et al. | 381/103 |

FOREIGN PATENT DOCUMENTS

| | | | |
|---|---|---|---|
| JP | 2002-163052 | A | 6/2002 |
| JP | 2007-295324 | A | 11/2007 |
| WO | 2006/070531 | A1 | 7/2006 |

OTHER PUBLICATIONS

"Yamaha Digital Workstation Tyros2 Owner's Manual", Yamaha 2005, pp. 68 and 79.

* cited by examiner

*Primary Examiner* — Christopher Uhlir
(74) *Attorney, Agent, or Firm* — Rossi, Kimms & McDowell LLP

(57) ABSTRACT

Each parameter is provided with increase/decrease switches and a slider. In a case where a user desires seamless rough control of the value of a target parameter, the user is to use the slider. In a case where the user desires easy control of the value of the parameter with the smallest unit of the resolution, the user is to use the increase/decrease switches. Since the slider specifies a parameter value in accordance with the position of the manipulated slider, the range within which the parameter value can change is determined on the basis of the current parameter value and the maximum value and the minimum value of the parameter. Because the increase/decrease switch increases/decreases a parameter value by "1" at each manipulation, the range within which the parameter value can change by a single manipulation of the increase/decrease switch is "±1".

13 Claims, 11 Drawing Sheets

FIG.3 focus position storing area (1, 0)

| | 0 | 1 | 2 | 3 | 4 | 5 | 6 | 7 |
|---|---|---|---|---|---|---|---|---|
| 0 | pointer to register of TRANSPOSE of MASTER | pointer to register of TRANSPOSE of SONG | pointer to register of TRANSPOSE of KBD | no assignment | pointer to register of PORTAMENTO TIME of LEFT | pointer to register of PORTAMENTO TIME of RIGHT 1 | pointer to register of PORTAMENTO TIME of RIGHT 2 | pointer to register of PORTAMENTO TIME of RIGHT 3 |
| 1 | pointer to register of TRANSPOSE of MASTER | pointer to register of TRANSPOSE of SONG | pointer to register of TRANSPOSE of KBD | no assignment | pointer to register of PITCH BEND RANGE of LEFT | pointer to register of PITCH BEND RANGE of RIGHT 1 | pointer to register of PITCH BEND RANGE of RIGHT 2 | pointer to register of PITCH BEND RANGE of RIGHT 3 |
| 2 | pointer to register of TRANSPOSE of MASTER | pointer to register of TRANSPOSE of SONG | pointer to register of TRANSPOSE of KBD | no assignment | pointer to register of OCTAVE of LEFT | pointer to register of OCTAVE of RIGHT 1 | pointer to register of OCTAVE of RIGHT 2 | pointer to register of OCTAVE of RIGHT 3 |
| 3 | pointer to register of TRANSPOSE of MASTER | pointer to register of TRANSPOSE of SONG | pointer to register of TRANSPOSE of KBD | no assignment | pointer to register of TUNING of LEFT | pointer to register of TUNING of RIGHT 1 | pointer to register of TUNING of RIGHT 2 | pointer to register of TUNING of RIGHT 3 |

FIG.5

| | 0 | 1 | 2 | 3 | 4 | 5 | 6 | 7 |
|---|---|---|---|---|---|---|---|---|
| 0 | no assignment | no assignment | no assignment | no assignment | pointer to register of PORTAMENTO TIME of LEFT | pointer to register of PORTAMENTO TIME of RIGHT 1 | pointer to register of PORTAMENTO TIME of RIGHT 2 | pointer to register of PORTAMENTO TIME of RIGHT 3 |
| 1 | no assignment | no assignment | no assignment | no assignment | pointer to register of PITCH BEND RANGE of LEFT | pointer to register of PITCH BEND RANGE of RIGHT 1 | pointer to register of PITCH BEND RANGE of RIGHT 2 | pointer to register of PITCH BEND RANGE of RIGHT 3 |
| 2 | no assignment | no assignment | no assignment | no assignment | pointer to register of OCTAVE of LEFT | pointer to register of OCTAVE of RIGHT 1 | pointer to register of OCTAVE of RIGHT 2 | pointer to register of OCTAVE of RIGHT 3 |
| 3 | no assignment | no assignment | no assignment | no assignment | pointer to register of TUNING of LEFT | pointer to register of TUNING of RIGHT 1 | pointer to register of TUNING of RIGHT 2 | pointer to register of TUNING of RIGHT 3 |

focus position storing area (1, 5)

PARAMETER SETTING APPARATUS HAVING SEPARATE OPERATORS FOR COURSE AND FINE ADJUSTMENTS FOR THE SAME PARAMETER

BACKGROUND OF THE INVENTION

1. Field of the Invention

The present invention relates to a parameter setting apparatus for setting respective values of parameters, particularly values of parameters which control multimedia data.

2. Description of the Related Art

Conventionally, parameter setting apparatuses for setting respective values of parameters, particularly values of parameters which control multimedia data have been known.

Such conventional parameter setting apparatuses include the one which has a plurality of first setting operators provided for respective parameters in order to control and set respective values of the parameters by the smallest unit and a second setting operator for seamlessly controlling the value of a parameter selected from among the plurality of parameters in accordance with the amount of a manipulation of the second setting operator (e.g., "YAMAHA DIGITAL WORKSTATION Tyros2 Owner's Manual", YAMAHA 2005, pages 68 and 79). In a case where a user of this conventional parameter setting apparatus desires to change the value of a parameter by a large amount, the second setting operator is to be used. In a case where the user desires to make fine adjustments of the value of a parameter by the smallest unit, the first setting operator provided for the parameter is to be used. As described above, the conventional parameter setting apparatus enables the user to use either the first setting operators or the second setting operator depending on the status of the parameter value that the user desires to control.

Because the conventional parameter setting apparatus employs an expensive dial operator as the second setting operator, only one dial operator is employed for cost reduction. Therefore, the conventional parameter setting apparatus is designed such that the user selects a parameter (hereafter referred to as "parameter situated on a focus position") from among the parameters to assign the selected parameter to the dial operator so that the user can control the value of the assigned parameter by use of the dial operator. Furthermore, the conventional parameter setting apparatus is designed such that if any first setting operator correlated with a parameter which is different from the one situated on the focus position is manipulated by the user, the focus position is transferred from the currently selected parameter to the parameter correlated with the manipulated first setting operator, with the value of the parameter of the post-transferred focus position being changed to a value corresponding to the manipulation of the first operator.

DISCLOSURE OF THE INVENTION

Problems to be Solved by the Invention

In a case where the user desires to change the respective values of some parameters by large amounts, however, the above-described conventional parameter setting apparatus requires the user to do inconvenient procedural steps of successively switching the parameters to be assigned to the dial operator and manipulating the dial operator to control the respective values of the parameters.

The dial operator is designed such that the user can change the value of a parameter either by a large amount or by the smallest unit with the one operator. However, it would be quite convenient for the user if third setting operators for controlling respective values of the parameters not precisely but by large amounts were provided for the respective parameters so that the user would choose the one between the first setting operators and the third setting operators depending on the status of a parameter the user desires to control. That is, in a case where the user desires to roughly control the value of a parameter, the user uses the third setting operator whereas in a case where the user desires to make a fine adjustment of the value of a parameter by the smallest unit, the user uses the first setting operator.

In addition, there are some cases where the user transfers the focus position to control respective values of some parameters by use of the setting operators including the first setting operators provided for the respective parameters. Conversely, there are other cases where the user desires to control respective values of the parameters without transferring the focus position. When the user controls respective values of the parameters by use of the setting operators provided for the respective parameters, as described above, the user desires to control the switching of the focus position in some cases.

However, the conventional parameter setting apparatus fails to satisfy the above-described user's desire. Because, in the case where the user controls the respective values of the parameters by use of the first setting operators, the focus position is inevitably transferred to the parameter correlated with the manipulated first setting operator. Of course, in a case where the user controls the value of the parameter situated on the focus position by use of the first setting operator correlated with the parameter, the focus position will not transfer. However, because in this case the user is supposed to use the second setting operator without purposely using the first setting operator, such a peculiar case will not be considered. During performance of an electronic musical instrument to which the conventional parameter setting apparatus is applied, particularly, the user is occasionally required to play music by manipulating performance operators with his one hand while controlling respective values of the parameters by quickly manipulating the first and second setting operators with his other hand. On such occasions, it can be inconvenient for the user that each manipulation of one of the first setting operators causes the transfer of the focus position.

The present invention pays attention to the former point, and an object thereof is to provide a parameter setting apparatus which allows both the seamless rough control of the value of one parameter and the easy control of the value of the one parameter by the smallest unit to enable quick control of the parameter value by a user. In addition, the present invention pays attention to the latter point as well, and an object thereof is to provide the parameter setting apparatus which enables the user to control the respective values of the parameters while also controlling the switching of the focus position.

Means for Solving the Problems

In order to achieve the former object, a feature of a parameter setting apparatus according to the present invention is to include storing means (7), a plurality of first operators (2*c*), a plurality of second operators (2*d*), first parameter changing means (5, S3), and second parameter changing means (5, S4). The storing means stores a plurality of parameters for controlling multimedia data, at least some of the parameters being related to each other. The first operators are respectively correlated with the stored parameters. The second operators are respectively correlated with the stored parameters. In response to a manipulation of one of the first operators, the first parameter changing means changes a value of the parameter correlated with the manipulated operator by the smallest unit. In response to a manipulation of one of the second operators, the second parameter changing means seamlessly changes a value of the parameter correlated with the manipulated operator in accordance with the manipulation.

In this case, the first operators are switches, for example, each of which increases or decreases the value of the correlated parameter by the smallest unit. Each of the second operators sets a value of the correlated parameter at a value corresponding to a position of the manipulated second operator within a range in which the parameter can take a value, for example. Furthermore, the parameter setting apparatus may further include nonlinearly converting means for nonlinearly converting a value indicative of a position of each manipulated operator of at least some of the second operators to a value of the parameter.

According to this feature, in response to a user's manipulation of one of the first operators, the first parameter changing means changes a value of the parameter correlated with the manipulated operator by the smallest unit. In response to a user's manipulation of one of the second operators, the second parameter changing means seamlessly changes a value of the parameter correlated with the manipulated operator in accordance with the manipulation. This feature allows both the seamless rough control of the value of one parameter and the easy control of the value of the one parameter by the smallest unit, enabling quick control of the parameter value by the user.

In order to achieve the latter object, another feature of the parameter setting apparatus according to the present invention is to include storing means (7), a plurality of first operators (2*c*), a plurality of second operators (2*d*), a third operator (2*a*), first parameter changing means (5, S3), second parameter changing means (5, S4) and third parameter changing means (5, S5). The storing means stores the parameters for controlling multimedia data. The first operators are respectively correlated with the stored parameters. The second operators are respectively correlated with the stored parameters. The third operator changes a value of the parameter placed on a focus position, the parameter being included in the parameters stored in the storing means. In response to a manipulation of one of the first operators, the first parameter changing means changes a value of the parameter correlated with the manipulated operator in accordance with the manipulation as well as transfers the focus position to the parameter correlated with the manipulated operator. In response to a manipulation of one of the second operators, the second parameter changing means changes a value of the parameter correlated with the manipulated operator in accordance with the manipulation without transferring the focus position. In response to a manipulation of the third operator, the third parameter changing means changes a value of the parameter placed on the focus position in accordance with the manipulation.

In this case, the parameter setting apparatus may further include displaying means (9, S2) for displaying the stored parameters in a matrix form on a display unit, wherein the respective first operators and the respective second operators are correlated with a plurality of columns of the parameters displayed in the matrix form, and selecting means (2*b*, S6) for selecting one of rows of the parameters displayed in the matrix form on the display unit. In response to a manipulation of one of the first operators, the first parameter changing means changes a value of the parameter designated by the column correlated with the manipulated operator and the selected row in accordance with the manipulation. In response to a manipulation of one of the second operators, the second parameter changing means changes a value of the parameter designated by the column correlated with the manipulated operator and the selected row in accordance with the manipulation.

Furthermore, the respective first operators and the respective second operators may be correlated with a plurality of rows of the parameters displayed in the matrix form. In this case, the selecting means selects one of a plurality of columns of the parameters. The first parameter changing means changes a value of the parameter designated by the row correlated with the manipulated operator and the selected column in accordance with the manipulation. The second parameter changing means changes a value of the parameter designated by the row correlated with the manipulated operator and the selected column in accordance with the manipulation.

According to the another feature, in response to a user's manipulation of one of the first operators, the first parameter changing means changes a value of the parameter correlated with the manipulated operator in accordance with the manipulation, as well as transfers the focus position to the parameter correlated with the manipulated operator. In response to a manipulation of one of the second operators, the second parameter changing means changes a value of the parameter correlated with the manipulated operator in accordance with the manipulation without transferring the focus position. Therefore, the another feature enables the user to control the respective values of the parameters while also controlling the switching of the focus position.

The present invention can be embodied not only as an invention of the parameter setting apparatus but also as inventions of a method and a computer program.

BRIEF DESCRIPTION OF THE DRAWINGS

FIG. 3 is an example data structure for setting respective values of parameters arranged in a matrix form;

FIG. 5 is an example data structure for setting respective values of the parameters displayed on the small LCD shown in FIG. 4;

DESCRIPTION OF THE PREFERRED EMBODIMENT

Figure 1:
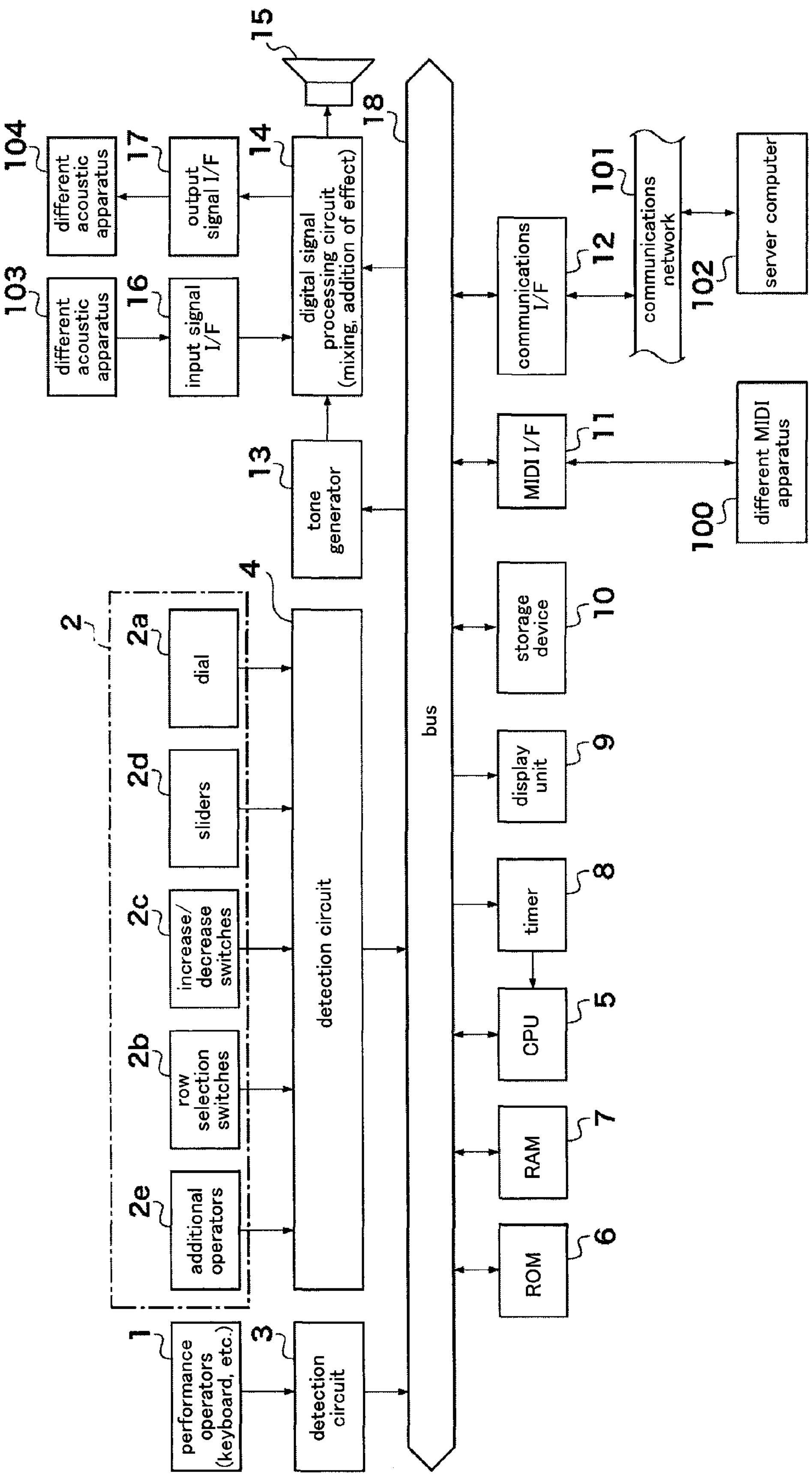
FIG. 1 is a block diagram showing a general configuration of an electronic musical instrument to which a parameter setting apparatus according to an embodiment of the present invention is applied.

An embodiment of the present invention will now be described with reference to the drawings. FIG. 1 is a block diagram indicating a general configuration of an electronic musical instrument to which a parameter setting apparatus according to an embodiment of the present invention is applied.

As indicated in FIG. 1, the electronic musical instrument of this embodiment is provided with performance operators 1, setting operators 2, detection circuits 3, 4, a CPU 5, a ROM 6, a RAM 7, a timer 8, a display unit 9, a storage device 10, a MIDI interface (MIDI I/F) 11, a communications interface (communications I/F) 12, a tone generator 13, a digital signal processing circuit 14 and a sound system 15. The performance operators 1 include a keyboard for inputting performance information including tone pitch information. The setting operators 2 include switches, sliders and a dial for inputting various kinds of information. The detection circuit 3 detects manipulation of the performance operators 1. The detection circuit 4 detects manipulation of the setting operators 2. The CPU 5 controls the entire apparatus. The ROM 6 stores control programs which are to be executed by the CPU 5, various kinds of table data and the like. The RAM 7 temporarily stores performance information, various kinds of input information, computed results and the like. The timer 8 measures interrupt time at timer interrupt services and various kinds of time. The display unit 9 displays various kinds of information and the like. The display unit 9 includes a small liquid crystal display (LCD) and light-emitting diodes (LEDs), for example. The storage device 10 stores various application programs including the above-described control programs, various kinds of song data, various kinds of data and the like. The MIDI I/F 11 inputs MIDI (Musical Instrument Digital Interface) messages from the outside and outputs MIDI messages to the outside. The communications I/F 12 transmits and receives data to/from a server computer (hereafter referred to as "server" for short) 102, for example, via a communications network 101. The tone generator 13 converts performance information input from the performance operators 1, performance information obtained by reproduction of song data stored in the storage device 10, and the like into musical tone signals. The digital signal processing circuit 14 mixes the musical tone signals transmitted from the tone generator 13 with musical tone signals output by a different acoustic apparatus 103 and then input via an input signal I/F 16, or adds various kinds of effects to the mixed musical tone signals and musical tone signals supplied from the tone generator 13 without being mixed. The sound system 15 converts the musical tone signals transmitted from the digital signal processing circuit 14 into acoustic signals. The sound system 15 is formed of a DAC (digital-to-analog converter), amplifiers, speakers and the like.

The above-described constituents 3 to 14 are interconnected via a bus 18. To the CPU 5, the timer 8 is connected. To the MIDI I/F 11, a different MIDI apparatus 100 is connected. To the communications I/F 12, the communications network 101 is connected. To the tone generator 13, the digital signal processing circuit 14 is connected. To the digital signal processing circuit 14, the sound system 15, the input signal I/F 16 and an output signal I/F 17 are connected. The communications I/F 12 and the communications network 101 may be either wired or wireless. Furthermore, the communications I/F 12 and the communications network 101 may be capable of both wired and wireless communication.

The setting operators 2 are formed of a dial 2*a*, row selection switches 2*b*, increase/decrease switches 2*c*, sliders 2*d* and additional operators 2*e*. The dial 2*a* is used in order to change the value of a parameter situated on a focus position. The row selection switches 2*b* are provided in order to select a row of up to 32 parameters. The 32 parameters are arranged on the small LCD of the display unit 9 to be shaped like a 4 (rows) by 8 (columns) matrix at the maximum. The increase/decrease switches 2*c* are correlated with the columns of the parameters respectively. The sliders 2*d* are correlated with the columns of the parameters respectively.

The storage device 10 includes storage media such as a flexible disk (FD), a hard disk (HD), a CD-ROM, a DVD (digital versatile disk), a magneto-optical disk (MO) and a semiconductor memory and their drives. These storage media may be removable from their drives. In addition, the storage device 10 itself may be removable from the electronic musical instrument. Alternatively, both the storage media and the storage device 10 may be undetachable. As described above, the storage device 10 (the storage media) can store the control programs which are to be executed by the CPU 5. In a case where the control programs are not stored in the ROM 6, the storage device 10 may store the control programs so that the programs are read into the RAM 7 to enable the CPU 5 to operate similarly to the case where the control programs are stored in the ROM 6. Such a configuration facilitates addition and update of the control programs.

The MIDI I/F 11 is not limited to a MIDI-specific interface but may be a general-purpose interface such as RS-232C, USB (Universal Serial Bus) and IEEE 1394. In the case where a general-purpose interface is employed, not only MIDI messages but also other data may be simultaneously transmitted or received.

As described above, the communications I/F 12 is connected to the communications network 101 such as LAN (Local Area Network), Internet or telephone lines so that the communications I/F 12 is connected to the server 102 via the communications network 102. In a case where the above-described various programs and various parameters are not stored in the storage device 10, the communications I/F 12 is used to download the programs and the parameters from the server 102. The electronic musical instrument serving as a client transmits a command requesting the downloading of the programs and parameters to the server 102 via the communications I/F 12 and the communications network 101. The server 102 receives the command and delivers the requested programs and parameters to the electronic musical instrument via the communications network 101. The electronic musical instrument receives the programs and parameters via the communications I/F 12 and stores the programs and parameters in the storage device 10 to complete the downloading.

As described above, the digital signal processing circuit 14 mixes input musical tone signals and adds various kinds of effects to the musical tone signals. The musical tone signals to be mixed by the digital signal processing circuit 14 are those supplied from the tone generator 13 and those input from the different acoustic apparatus 103 via the input signal I/F 16. In a case where the musical tone signals are configured by a plurality of channels, channel numbers and the number of channels of the musical tone signals to be mixed can be freely determined by a user. Therefore, the digital signal processing circuit 14 can mix the musical tone signals of some channels of those supplied from the tone generator 13 with the musical tone signals of some channels of those supplied from the different acoustic apparatus 103. Even in a case where the musical tone signals are supplied from both the tone generator 13 and the different acoustic apparatus 103, furthermore, the digital signal processing circuit 14 can extract only musical tone signals of some channels of those supplied from either of them to mix the extracted musical tone signals. Furthermore, the digital signal processing circuit 14 can add the effects to the mixed musical tone signals. The digital signal processing circuit 14 can also add the effects to the yet-to-be mixed musical tone signals. In the case of the yet-to-be mixed signals, the digital signal processing circuit 14 can add the various effects only to some channels. The musical tone signals to be output by the digital signal processing circuit 14 are allowed to be delivered not only to the sound system 15 but to a different acoustic apparatus 104 via the output signal I/F 17.

As obvious from the above-described configuration, the electronic musical instrument of this embodiment is applied to an electronic keyboard musical instrument. However, the electronic musical instrument of the embodiment is not limited to the embodiment of the keyboard musical instrument but may be applied to different embodiments such as a stringed instrument, a wind instrument and a percussion instrument. Furthermore, this electronic musical instrument may be embodied on a general PC to which a keyboard is externally connected. Furthermore, this electronic musical instrument may be embodied on an acoustic apparatus such as a mixer. In such a case, although a signal processing circuit for mixing musical tone signals and an AD/DA converting circuit are indispensable constituents, a tone generator is not indispensable. In addition, although the functional configuration for generating and emitting musical tone signals (i.e., the constituents 13 to 17) is configured integrally with the other functional configuration for setting parameters (i.e., the rest constituents) in this embodiment, these functional configurations may be configured separately.

The electronic musical instrument of this embodiment is provided with a function of setting respective values of parameters, especially, values of parameters for controlling multimedia data as the main function. Examples of the parameters for controlling multimedia data include: 1. Various kinds of parameters for generating musical tones, the parameters being stored in various registers provided on the tone generator 13 and being used by the tone generator 13 for generation of musical tones; 2. Parameters for adding effect and parameters for mixing, the parameters being stored in various registers provided on the digital signal processing circuit 14 and being used when the digital signal processing circuit 14 adds various effects to supplied musical tone signals or when the digital signal processing circuit 14 mixes supplied musical tone signals; and 3. Parameters necessary for a MIDI sequencer which is software for automatic performance (e.g., the sequencer previously stored in the storage device 10 or downloaded from the server 102 via the communications I/F 12 and the communications network 101 to be stored in the storage device 10) to operate (i.e., not the parameters directly required for generation of musical tones but the parameters required for generation of performance information). In addition, other examples include parameters for controlling not musical tones but for controlling images.

The parameters to be controlled by the electronic musical instrument of this embodiment may be either those previously stored in the ROM 6 or the storage device 10 or those externally supplied via the MIDI I/F 11 or the communications I/F 12 to be stored in the RAM 7 or the storage device 10.

Figure 2:
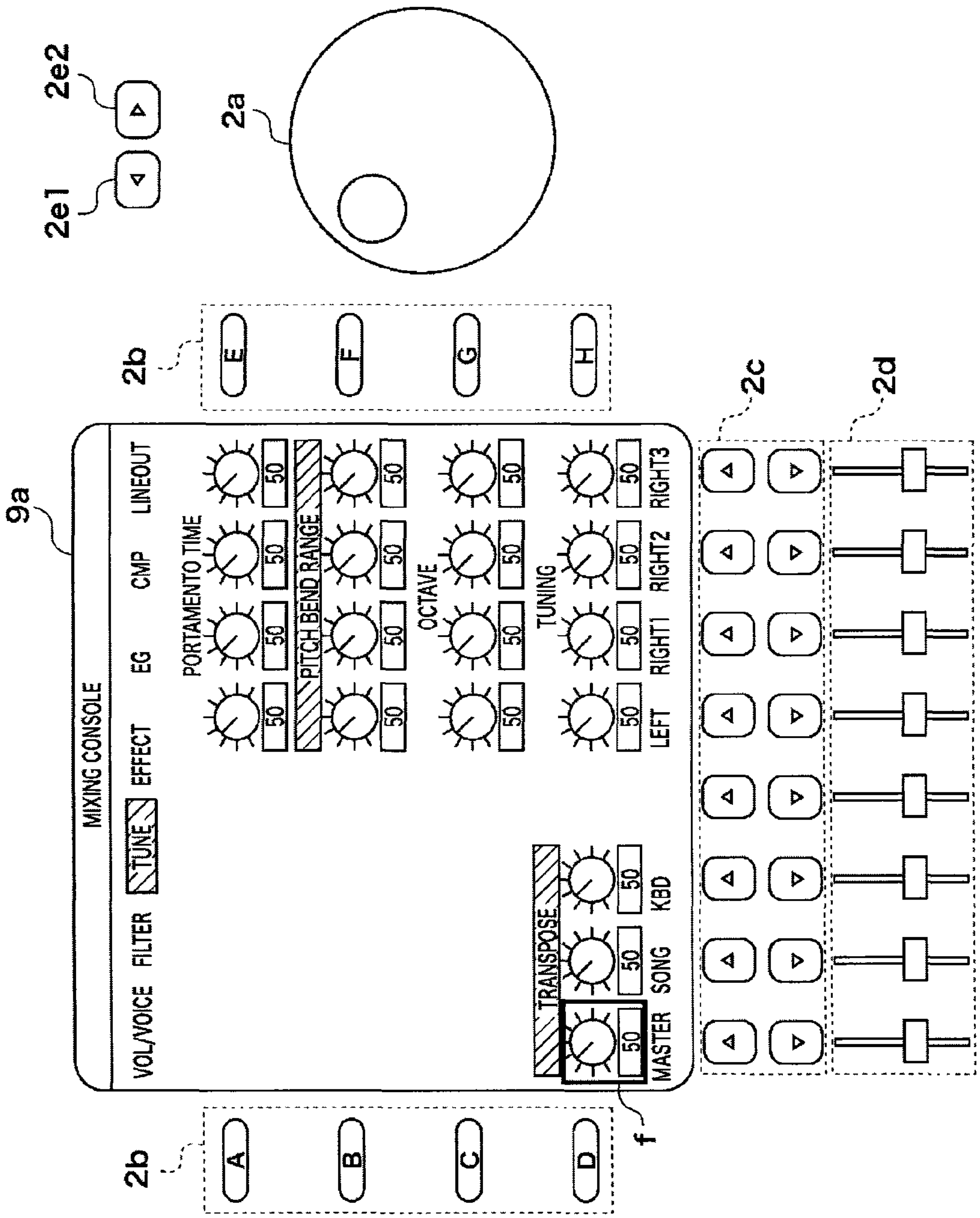
FIG. 2 is a top view of part of a panel situated around a small LCD which configures a display unit shown in FIG. 1.

FIG. 2 is a top view of part of a panel situated around the small LCD 9*a* which configures the display unit 9. As indicated in FIG. 2, around the small LCD 9*a*, the dial 2*a*, the row selection switches 2*b*, the increase/decrease switches 2*c*, the sliders 2*d* and category selection switches 2*e*1, 2*e*2 are arranged.

The shown example of the electronic musical instrument indicates a state where a parameter setting mode is selected, so that the operating mode is in the parameter setting mode with a category of "TUNE" being selected from among a plurality of categories for the parameters. On the small LCD 9*a*, the parameters belonging to the category "TUNE" (in the shown example, 19 parameters) and their current setting status are displayed. More specifically, the small LCD 9*a* displays respective names of the parameters, respective numeric values ("50") indicative of set values of the parameters and knob-shaped indicators each visually indicating the current set value with respect to the programmable range of the parameter. The name of the selected category (i.e., "TUNE") is diagonally shaded so that the user can recognize that the category is being currently selected. Of course, the "shading" is adopted for convenience in drawing. Therefore, any manner can be adopted such as highlighting or variations in display color or display font. The "shading" used for other parts can be similarly replaced.

The dial 2*a* changes the value of the focused parameter included in the parameters arranged in a matrix form. If the dial 2*a* is turned clockwise, the value of the parameter increases by an amount corresponding to the amount of the turn. If the dial 2*a* is turned counterclockwise, the value of the parameter decreases by an amount corresponding to the amount of the turn. The focus position is indicated by a box f around the set value of the parameter and the knob-shaped indicator. In this embodiment, if any one of the increase/decrease switches 2*c* is manipulated, the focus position f transfers among the columns along with the increase/decrease of the value of the parameter correlated with the manipulated increase/decrease switch.

Respective row selection switches 2*b* are arranged to be correlated with the respective rows of parameters arranged in the matrix form so that a depression of any one of the row selection switches 2*b* by the user leads to a selection of the row correlated with the depressed row selection switch. Among the four row selection switches 2*b* placed on the left side of the small LCD 9*a* and the four row selection switches 2*b* placed on the right side, a depression of either row selection switch placed in a horizontal position results in a selection of the same row. For example, if the user depresses either the row selection switch "B" or the row selection switch "F", the second row is to be selected. However, not all the columns of each selectable row are assigned a programmable parameter. In the shown example, only one row is assigned programmable parameters on the first to third columns, whereas the fourth column is not assigned any programmable parameter. Furthermore, FIG. 2 indicates a state where on such a parameter arrangement, the row selection switch "F" (or "B") has been depressed. That is, the depression of the row selection switch "F" indicates user's intention to select the second row. If any programmable parameter is assigned to the row, therefore, the parameters of the row (in the shown example, parameters "PITCH BEND RANGE") are to be selected. If any programmable parameter is not assigned to the row, parameters of a certain row such as parameters of a row which is the closest to the user's selected row (in the shown example, parameters "TRANSPOSE") are to be selected. If there is a column to which any parameter is not assigned (in the shown example, the fourth column), the column is not to be selected on any row, of course.

As obvious from the example of FIG. 2, in spite of the expression "the parameters are arranged in a matrix form", the matrix in which the parameters are arranged actually has omissions (parts where any parameter is not assigned). Therefore, this "matrix" does not coincide with a "matrix" defined in terms of mathematics. However, the arrangement of the parameters can coincide with a mathematically defined "matrix" in some cases such as a case in which 32 parameters are fully arranged without a single omission and a case in which a whole row or a whole column is missing (see FIG. 4). In this specification, claims, figures and abstract, therefore, the expression "the parameters are arranged in a matrix form" includes even the case in which the arrangement of the parameters does not completely coincide with a mathematically defined "matrix".

Figure 4:
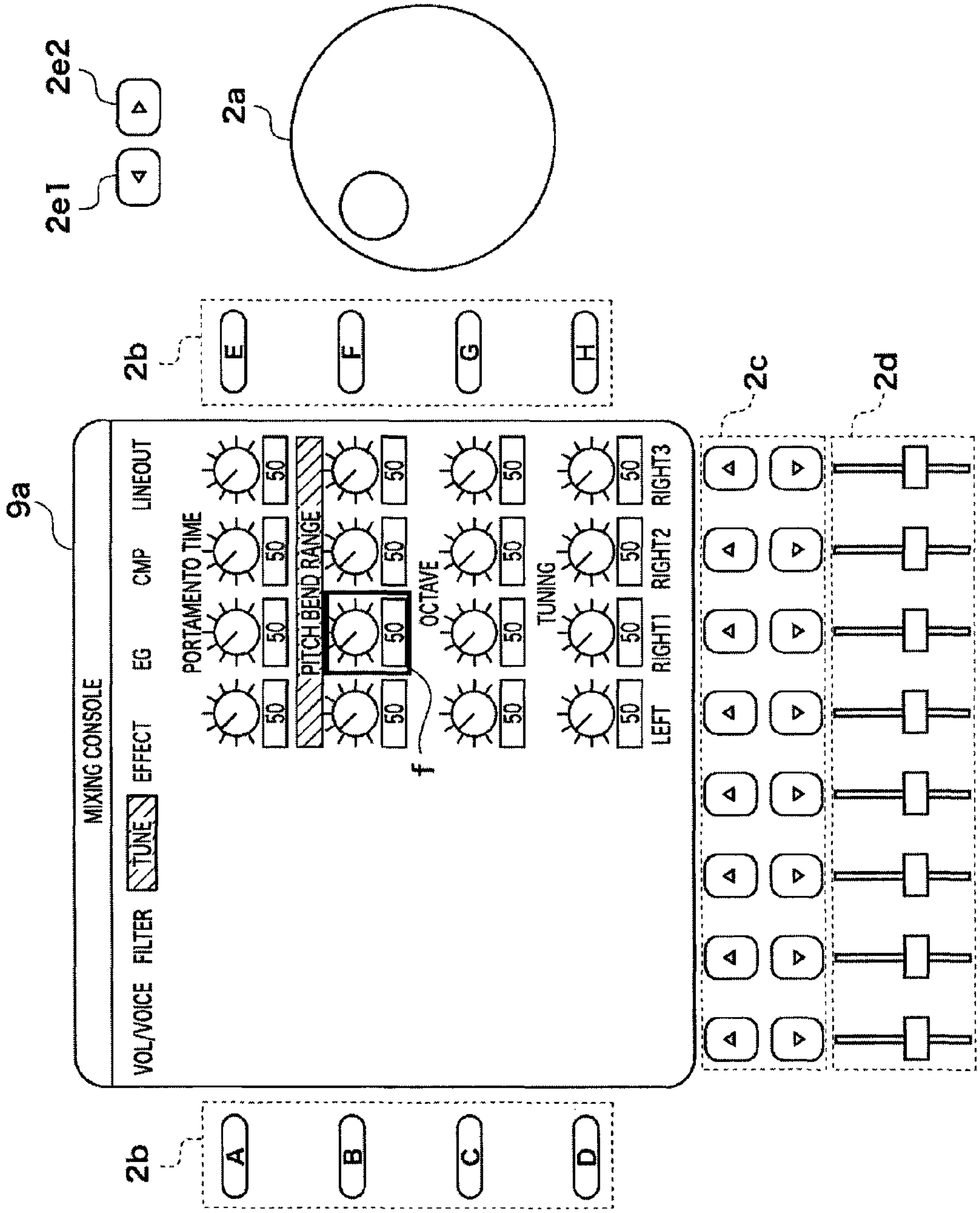
FIG. 4 is a top view of part of the panel around the small LCD of a case in which the parameters of "TRANSPOSE" shown in FIG. 2 are deleted.

FIG. 4 is a top view of part of the panel around the small LCD 9*a* of a case in which the parameters of "TRANSPOSE" shown in FIG. 2 are deleted. In FIG. 4, because any parameter is not assigned to the first through fourth columns on every row, the user cannot select the first to fourth columns on each row.

As for FIG. 2 again, the increase/decrease switches 2*c* are correlated with columns of the parameters arranged in the matrix form respectively. In response to a depression of any one of the increase/decrease switches 2*c*, therefore, the value of the parameter designated by the row selected by use of the row selection switches 2*b* and the column correlated with the depressed increase/decrease switch increases or decreases by "1". If the user depresses the increase/decrease switch correlated with the parameter (column) which is not focused (which is not the parameter of the focus position f), the focus position f also transfers to the position of the parameter with which the depressed increase/decrease switch is correlated (the parameter of the selected row). This embodiment may be modified such that the first depression of one of the increase/decrease switches 2*c* results only in the transfer of the focus position f whereas the following second and later depressions of the increase/decrease switch result in increment/decrement in the value of the corresponding parameter.

Similarly to the increase/decrease switches 2*c*, the sliders 2*d* are correlated with the columns of the parameters arranged in the matrix form respectively, so that a manipulation of any one of the sliders 2*d* results in a change in the value of the parameter designated by the row selected by use of the row selection switches 2*b* and the column with which the manipulated slider is correlated. Unlike the increase/decrease switches 2*c*, however, a manipulation of the slider will not result in increment/decrement of "1", but the value of a parameter with which the manipulated slider is correlated is to be changed in accordance with the slid position. In addition, a manipulation of any slider will not result in the transfer of the focus position f.

FIG. 3 indicates an example data structure for setting respective values of the parameters arranged in the matrix form. As indicated in FIG. 3, in a certain area of the RAM 7, a pointer storing area for storing pointers each indicative of the position of a register in which the value of each parameter arranged in the matrix form is actually set and a focus position storing area for storing a focus position in the pointer storing area are provided.

The pointer storing area is formed from a 4 (rows) by 8 (columns) matrix. The rows are given integers "0" to "3", whereas the columns are given integers "0" to "7", respectively. This embodiment is designed such that the rows and the columns are counted from "1" whereas the integers are given to the respective rows and columns from "0". The former is because it is customary to do so whereas the latter is because of the convenience of the CPU 5. However, since there is no any other reason, one of them may be changed to conform to the other. Similarly to respective elements of a mathematical matrix, therefore, the respective pointers stored in the pointer storing area are to be designated by the row number and the column number.

This embodiment is provided with only one pointer storing area so that at each change of category, pointers each indicative of each parameter belonging to the category are to be stored in the pointer storing area. The registers in which the values of the parameters are actually set are fixed for the respective parameters. Therefore, if a parameter is selected, its pointer is also uniquely identified. Therefore, table data which correlates programmable parameters with their pointers, respectively, is previously created to be stored in the ROM 6, for example. When a category is selected to display the parameters belonging to the selected category on the small LCD 9*a*, the pointers corresponding to the parameters are read out from the table data to be stored in the corresponding positions in the pointer storing area. In the pointer storing area, there are some areas in which any pointer is not stored. In such areas, information indicative of "no assignment" (e.g., "FF") is stored. The information indicative of "no assignment" is stored only in a column in which no parameter is assigned to any row. In other words, in a column having a row to which a parameter is assigned, the information indicative of "no assignment" will not be stored. As indicated in FIG. 2, more specifically, on the first to third columns, the parameter is assigned only to the fourth row. On those columns, in other words, the parameter is assigned to fill the largest row number (the fourth row in this embodiment). In the pointer storing area indicated in FIG. 3, however, as indicated by dashed lines, on the first column ("0") to the third column ("2"), the pointers of the fourth row ("3") are given to the first ("0") through third ("2") rows as well. As described above, this embodiment is designed such that in the pointer storing area, even some areas in which any pointer is not actually stored store the pointers which are stored in the nearby area in order to facilitate the control of the focus position.

FIG. 5 is an example data structure for setting the respective values of the parameters displayed on the small LCD 9*a* shown in FIG. 4. On the small LCD 9*a* of FIG. 4, any parameter is not assigned to any row of the first to fourth columns. In the pointer storing area, therefore, the information indicative of "no assignment" is stored for every row ("0" to "3") of the first ("0") to fourth ("3") columns.

As for FIG. 3 again, in the focus position storing area, information indicative of the currently focused position (i.e., (the row number, the column number) in this embodiment) is stored. In the shown example, the focus position storing area stores (1, 0). That is, the currently focused position is the parameter placed in the first column of the second row (in the pointer storing area, the parameter indicated by "pointer to register of TRANSPOSE of MASTER" enclosed by heavy lines). The focus position f of FIG. 2 is placed on the first column of the fourth row, while the focus position stored in the focus position storing area of FIG. 3 is placed on the first column of the second row, resulting in different row numbers between them. This is because even in a case where any parameter is not actually assigned to the row selected by the user by use of the row selection switches 2*b*, if any parameter is situated on a row which is the closest to the user's selected row, the parameter is assumed to be assigned to the selected row as well. In the pointer storing area, the pointer for the parameter is stored in the corresponding position, with the user's selected row being dealt as the row of the focus position regardless of whether any parameter is assigned to the row. Even though a contradiction arises between the row of the focus position and the row on the display, in other words, the contradiction is ignored in order to simplify the control of the focus position (particularly, the control of the row). In a case where there is no need to simplify the control of the focus position, therefore, the row of the focus position may conform to the row on the display. In this case, more specifically, the structure of the pointers stored in the pointer storing area is to be modified to conform to the structure of the parameters arranged in the matrix form. In the example of the pointer storing area shown in FIG. 3, that is, in the section of the columns of "0" to "2" of the rows "0" to "2" included in the area enclosed by dashed lines, information indicative of "no assignment" is to be stored.

Figure 6:
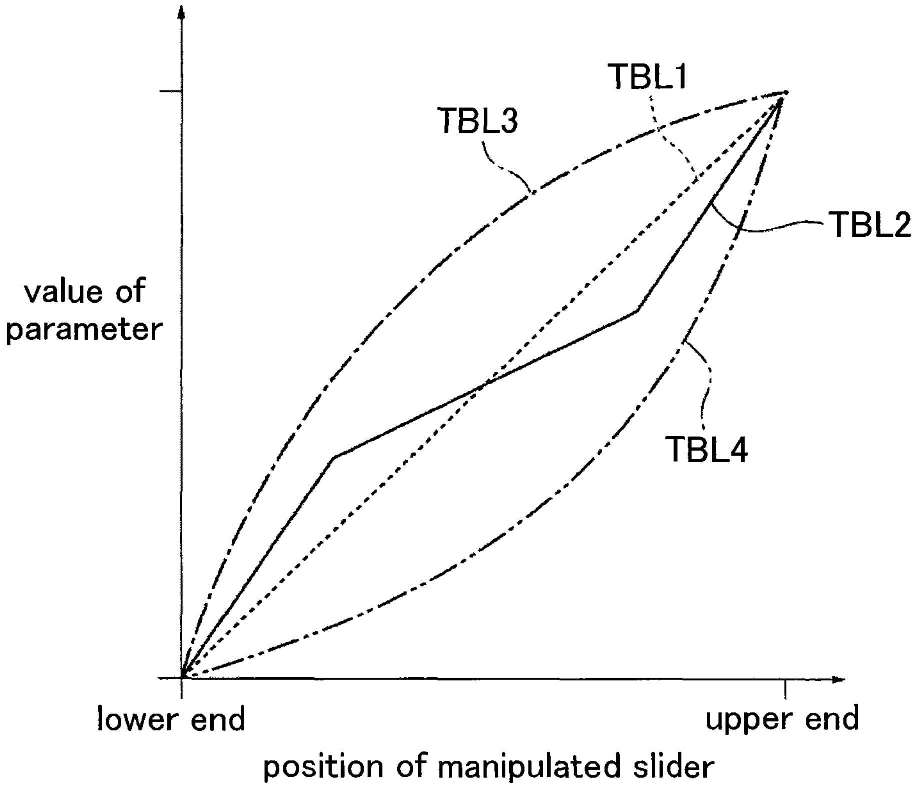
FIG. 6 is a graph of example conversion tables for converting the position of a manipulated slider into a value of a parameter.

A control process to be carried out by the electronic musical instrument configured as described above will be briefly explained with reference to FIG. 2 and FIG. 6. Then, a detailed description of the control process will follow with reference to FIGS. 7 to 11.

For example, the user manipulates a mode switch (not shown) included in the other operators 2_e_ to change the operating mode to parameter setting mode, and then manipulates the category selection switches 2_e_1, 2_e_2 to select the category of "TUNE". Then the user manipulates the row selection switch denoted as "F" to select the second row. On the small LCD 9_a_ of the display unit 9, in this case, as shown in FIG. 2, the parameters belonging to the category of "TUNE" are arranged in the matrix form to display the current setting status of the respective parameters with the parameters of the second row being selected. However, because any parameter is not assigned to the second row of the first to third columns, the row having the parameters, that is, the fourth row is apparently selected for the first to third columns. In this state of display, if the user turns the dial 2_a_, the value of the parameter where the focus position f is placed (in the shown example, "TRANSPOSE of MASTER") increases/decreases by an amount corresponding to the direction and the amount of the turn.

In the above-described setting status of the parameters, if the user depresses the increase switch of the third column included in the increase/decrease switches 2_c_ once, the focus position f transfers to the third column to increase the value of the parameter situated in the focus position (in the shown example, "TRANSPOSE of KBD") by "1".

In the setting status of the parameters prior to the depression of the increase switch of the third column, if the user manipulates the slider of the fifth column included in the sliders 2_d_, the value of the parameter of the fifth column of the second row (in the shown example, "PITCH BEND RANGE of LEFT") is set at a value corresponding to the position of the manipulated slider. The manipulation of the slider does not involve the transfer of the focus position f. If the user then turns the dial 2_a_, therefore, the value of the parameter situated in the focus position f, that is, the value of "TRANSPOSE of MASTER" increases/decreases by an amount corresponding to the direction and the amount of the turn.

In this embodiment, as described above, the user is able to move the focus position by manipulating the increase/decrease switches 2_c_ to set the respective values of the respective parameters, whereas the user is also able to set the respective values of the parameters without the transfer of the focus position by manipulating the sliders 2_d_. Therefore, this embodiment enables the user to control the respective values of the parameters as well as to control the switching of the focus position as the user desires.

This embodiment is designed such that as the operators for controlling the respective values of the parameters with the transfer of the focus position, the increase/decrease switches 2_c_ are used, whereas as the operators for controlling the respective values of the parameters without the transfer of the focus position, the sliders 2_d_ are used. However, the types and the combination of the operators are not limited to those of this embodiment. That is, the same type of operators may be adopted as both the former operators and the latter operators (anything can be adoptable as long as they are capable of changing the respective values of the parameters such as increase/decrease switches, sliders, knobs, wheels, and keypad, for example). In a case where different types of operators are adopted between the former operators and the latter operators, two types of operators may be freely selected from among the various types of operators indicated above as examples.

In the case where the value of a target parameter is specified by the manipulation of the slider included in the sliders 2_d_, the value of the parameter is to be set at a value corresponding to the position of the manipulated slider, as described above. FIG. 6 is a graph of example conversion tables for converting the position of a manipulated slider into a value of a parameter. This figure indicates, as examples, one kind of linear conversion table (indicated by a dashed line) TBL1 and three kinds of non-linear conversion tables (indicated by a solid line, a chain line and a chain double-dashed line) TBL2, TBL3, TBL4. In this embodiment, each parameter is provided with the conversion table so that a manipulation of a slider leads to a conversion of the manipulated position into a parameter value through the use of the conversion table provided for the target parameter to set the target parameter at the resultant parameter value obtained by the conversion. The conversion tables may be previously stored in the ROM 6 so that the conversion tables are read out as needed.

In a case where a target parameter is given the linear conversion table TBL1, for example, because the position of the manipulated slider is converted into a parameter value proportional to the position, it seems that there is little difference between the control of the parameter value by use of the slider and the control of the parameter value by use of the increase/decrease switch as long as no mention is made of the transfer of the focus position. Firstly, however, between the sliders 2_d_ and the increase/decrease switches 2_c_, there is a difference in the range within which the user is allowed to change the value of a parameter by a single manipulation. Between the sliders 2_d_ and the increase/decrease switches 2_c_, secondly, the degree of difficulty in increasing/decreasing a parameter value with their respective resolutions (by the smallest unit) varies. More specifically, since the sliders 2_d_ are used in order to specify a parameter value in accordance with the position of the manipulated slider, the range in which the parameter value can change is determined on the basis of the current parameter value and the maximum value and the minimum value of the parameter. More specifically, assuming that a target parameter is provided with programmable integers ranging from the minimum value of "0" to the maximum value of "127", with the current parameter value being "50", the range within which the parameter value can change extends up to "77" toward the plus direction and up to "50" toward the minus direction. Because the increase/decrease switches 2_c_ increases/decrease a parameter value by "1" at each manipulation, the range within which the parameter value can change by a single manipulation of the increase/decrease switches 2_c_ is "±1". As for the sliders 2_d_ provided on the small operating panel of a musical instrument or the like, the operating range of the sliders 2_d_ is small. Even if the sliders 2_d_ are designed to operate at 7-bit resolution (128 partitions) so that the user can operate the sliders 2_d_ with the resolution, the user has to be experienced in order to operate the sliders 2*d* with the resolution. However, the increase/decrease switches 2*c* enable the user to increase/decrease the parameter value with the resolution by a simple manipulation of the increase/decrease switches 2*c*. Therefore, the sliders 2*d* enable the seamless rough control of the value of a target parameter, whereas the increase/decrease switches 2*c* enable the easy control of the value of a target parameter with the resolution.

As described above, this embodiment provides the user with the two different ways of controlling the respective values of the parameters: the seamless rough control and the easy control by the smallest unit. In this embodiment, moreover, the user can quickly switch between the two different ways to control the respective values of the parameters.

In a case where the non-linear conversion tables TBL2, TBL3, TBL4 are used as the conversion tables, this embodiment not only brings about the above-described effect but also allows the operating range of the slider to include both a part where the resolution is low and a part where the resolution is high. Therefore, this embodiment is provided with different shapes of non-linear conversion tables so that each parameter is given a suitable conversion table according to its type, enabling the user to quickly reach his intended values of the parameters.

Figure 7:
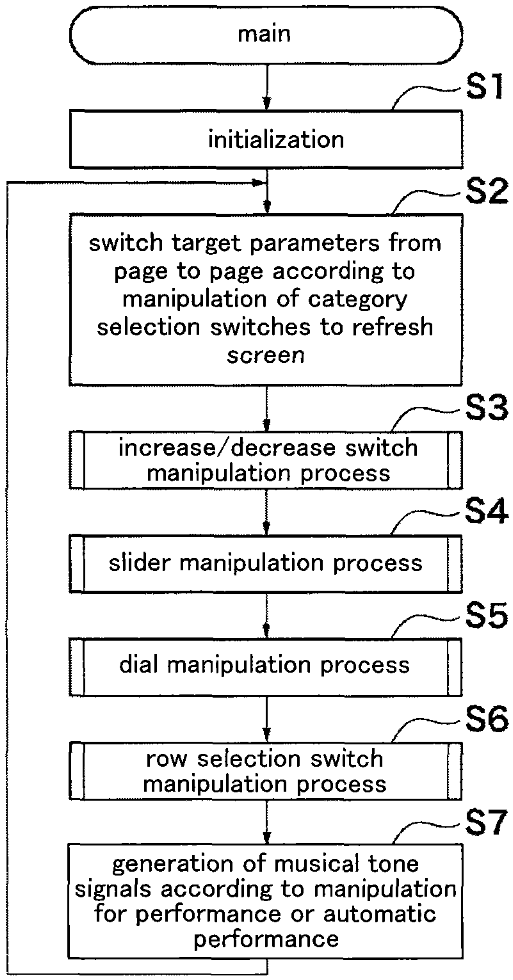
FIG. 7 is a flowchart indicating steps of a main routine to be carried out by the electronic musical instrument, particularly by the CPU shown in FIG. 1.

Next, this control process will be described in detail. FIG. 7 is a flowchart indicating steps of a main routine to be carried out by the electronic musical instrument, particularly by the CPU 5, of this embodiment.

In this main routine, the CPU 5 mainly carries out the following processes: (1) initial setting process (step S1); (2) target parameter switching process (step S2); (3) increase/decrease switch manipulation process (step S3); (4) slider manipulation process (step S4); (5) dial manipulation process (step S5); (6) row selection switch manipulation process (step S6); and (7) musical tone signal generation process (step S7). This main routine is started when the power is turned on by the manipulation of a power switch (not shown) included in the other operators 2*e*. After the start, the initial setting process (1) is carried out once, being followed by the processes (2) to (7). If the process (7) is completed, the process (2) is carried out again to repeat the processes (2) to (7) until the power is turned off by the manipulation of the power switch.

In the initial setting process (1), the CPU 5 performs initialization such as clearing the RAM 7, setting various parameter values to defaults, starting the measurement of time by the timer 8, and setting the operating mode to default mode.

If the user manipulates the mode switch to select the parameter setting mode, the CPU 5 makes the operating mode enter the parameter setting mode, and then proceeds to the target parameter switching process (2). In the target parameter switching process (2), the CPU 5 switches target parameters from page to page in accordance with user's manipulation of the category selection switches 2*e*1, 2*e*2 to refresh the display of the small LCD 9*a*. The "page" refers to one screen of the small LCD 9*a*. In this embodiment, more specifically, each selectable category is allowed to have up to one page of programmable parameters (in this embodiment, up to 32 parameters arranged in a 4-by-8 matrix). At each switching of the category, target programmable parameters are switched to the parameters belonging to the post-switching category. At the same time, the parameters of one screen of the small LCD 9*a* are also switched to the parameters belonging to the post-switching category.

Figure 8:
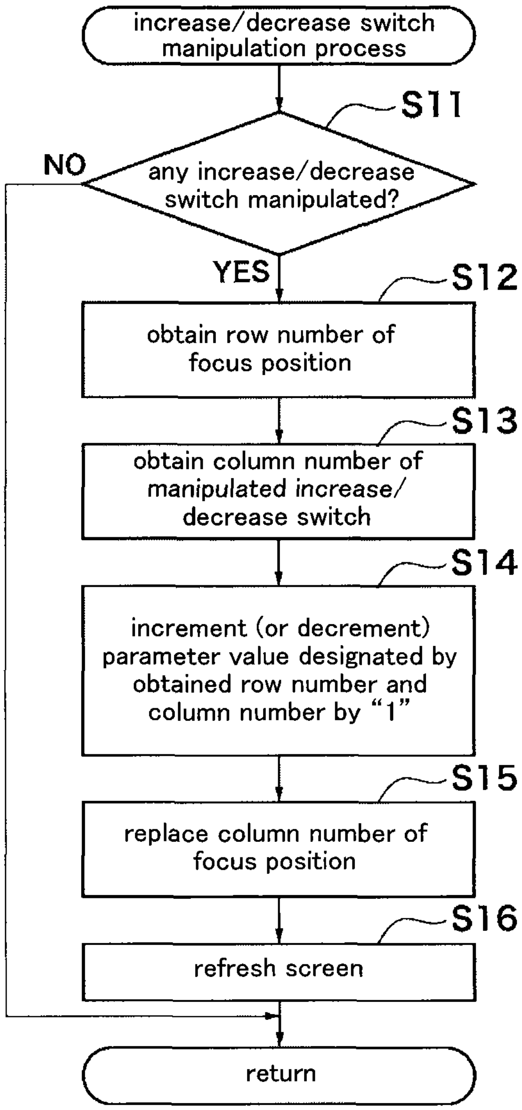
FIG. 8 is a flowchart indicating detailed steps of an increase/decrease switch manipulation process indicated in FIG. 7.

FIG. 8 is a flowchart indicating detailed steps of the increase/decrease switch manipulation process (3). In the increase/decrease switch manipulation process (3), first, the CPU 5 checks at all times whether any one of the increase/decrease switches 2*c* has been manipulated (step S11). If none of the increase/decrease switches 2*c* have been manipulated, the increase/decrease switch manipulation process (3) is finished (step S11→return). If any one of the increase/decrease switches 2*c* has been manipulated, the CPU 5 reads out the focus position stored in the focus position storing area to obtain the row number of the read focus position (step S12). In the example of FIG. 3, because the focus position storing area stores (1, 0) as the focus position, the CPU 5 obtains "1" as the row number in step S12.

Then, the CPU 5 obtains the column number of the manipulated increase/decrease switch (step S13). Because the increase/decrease switches 2*c* are correlated with the columns of the matrix, once the manipulated increase/decrease switch is identified, the column number correlated with the increase/decrease switch can be easily obtained. In the example of FIG. 2, in a case where the increase switch of the six column has been manipulated, for example, the CPU 5 obtains "5" as the column number in step S13.

Then, the CPU 5 increments (or decrements) the value of the parameter designated by the obtained row number and column number by "1" (step S14). The increment in the parameter value is made when any one of the increase switches 2*c* has been manipulated, whereas the decrement in the parameter value is made when any one of the decrease switches 2*c* has been manipulated. In the case where the CPU 5 obtains "1" as the row number and "5" as the column number, as described above, because the pointer placed on the position of (1, 5) in the pointer storing area of FIG. 3 indicates "register of PITCH BEND RANGE of RIGHT 1", the target parameter to be incremented is "PITCH BEND RANGE of RIGHT 1". Therefore, the CPU 5 increments the value of the parameter "PITCH BEND RANGE of RIGHT 1" (that is, the value stored in the register) by "1". Each target parameter has a range of programmable values. Therefore, in a case where the increase switch is manipulated even though the parameter value is at the maximum, or in a case where the decrease switch is manipulated even though the parameter value is at the minimum, the manipulation of the increase/decrease switch is disabled.

Then, the CPU 5 changes the column number of the focus position to the column number obtained in step S13 to replace the focus position stored in the focus position storing area with the focus position whose column number has been changed (step S15). There can be a case where the column number obtained in step S13 is identical to the column number of the focus position. In such a case, the replacement process of step S15 is not required. Of course, even if the replacement process of step S15 is carried out in such a case as well, any problem will not arise.

Then, the CPU 5 refreshes the screen of the small LCD 9*a* (step S16). By this refresh, in the example of FIG. 2, the focus position f is transferred to the parameter placed on the six column of the second row (see FIG. 4). However, because the number of programmable parameters varies between FIG. 4 and FIG. 2, FIG. 4 does not show a state in which the focus position f shown in FIG. 2 is simply transferred. In addition, the value of the parameter is changed from "50" to "51", with the position indicated by the knob-shaped indicator also being changed.

Figure 9:
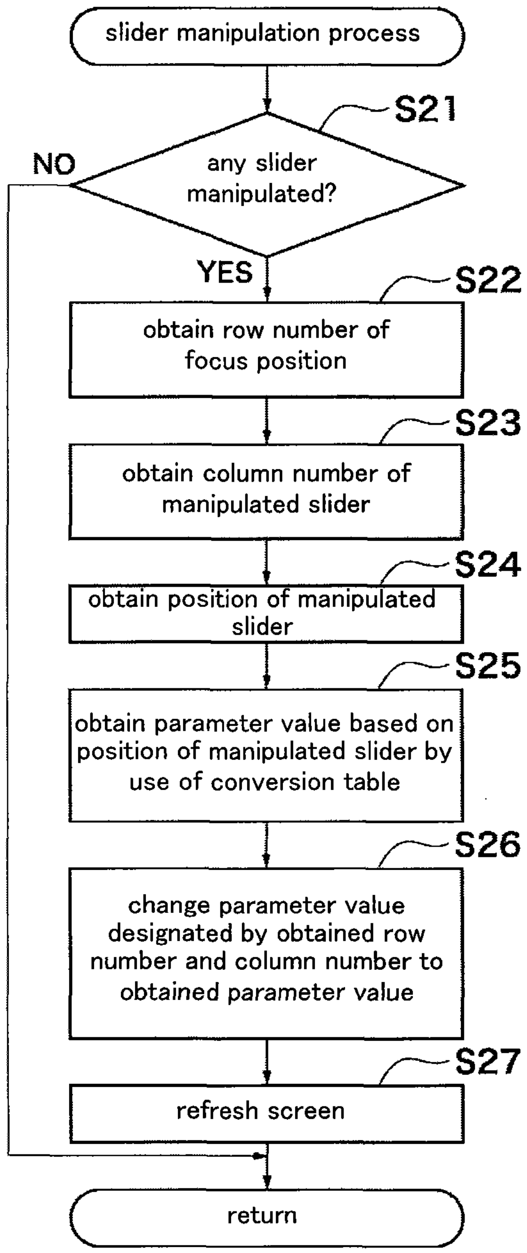
FIG. 9 is a flowchart indicating detailed steps of a slider manipulation process indicated in FIG. 7.

FIG. 9 is a flowchart indicating detailed steps of the slider manipulation process (4). In the slider manipulation process (4), firstly, the CPU 5 checks at all times whether any one of the sliders 2*d* has been manipulated (step S21). If any of them has not been manipulated, the CPU 5 finishes the slider manipulation process (4) (step S21→return). If any of them has been manipulated, the CPU 5 proceeds to step S22.

Steps S22 and S23 are almost similar to the above-described steps S12 and S13 except that the type of the manipulated operator is different between steps S22 and S23 and steps S12 and S13. Because the details of steps S22 and S23 can be easily inferred from steps S12 and S13, detailed explanation about steps S22 and S23 will be omitted.

Then, the CPU 5 obtains the position of the manipulated slider (step S24). Each slider is provided with a certain operating range so that the operating range is divided with a certain resolution. If the user manipulates an operating knob, for example, to specify the position of the slider (not shown), the CPU 5 obtains a numeric value (an integer value) corresponding to the position of the manipulated slider from the detection circuit 4. Strictly speaking, in step S24, the CPU 5 obtains the numeric value corresponding to the position of the manipulated slider. However, because the numeric value is correlated with the position of the manipulated operator in a one-to-one relationship, it is considered that the CPU 5 obtains the position of the manipulated slider for the sake of explanation.

Then, the CPU 5 obtains, by use of the conversion table, a parameter value on the basis of the position of the manipulated slider obtained in step S24 (step S25). In this embodiment, once a parameter is identified, a conversion table to be used is also uniquely identified. Therefore, the CPU 5 uses the conversion table to obtain a parameter value on the basis of the obtained position of the manipulated slider. The relationship between the respective parameters and the respective conversion tables is determined on the basis of a user's previously made selection or an optimally made factory-set selection.

Then, the CPU 5 changes the value of the parameter designated by the obtained row number and column number to the parameter value obtained in step S25 (step S26). Take the concrete example used for the explanation of step S14 in which the CPU 5 obtains "1" as the row number and "5" as the column number as an example here. The target parameter to be controlled is "PITCH BEND RANGE of RIGHT 1" whose value (the value stored in the register) is to be changed to the value obtained in step S25. In this embodiment, because any of the sliders 2*d* do not employ motor sliders (sliders whose operating knob automatically transfer, in accordance with a set value of a corresponding parameter, to an operational position according to the set value), the difference between the current value of the target parameter to be controlled and the parameter value obtained according to the position of the manipulated slider can be large in the process of step 26. Even in such a case, however, the value of the target parameter is immediately changed to the obtained parameter value. In a case where an abrupt change in the value of a parameter can cause any trouble, a parameter setting that may involve an abrupt change in the parameter value is preferably achieved by gradual changes in the parameter value to realize a target value. Alternatively, this embodiment may be designed not to change a parameter value right after the manipulation of a slider but to change the parameter value to a value corresponding to the position of the manipulated slider after a lapse of a predetermined time. This embodiment may be also modified such that at the point in time when the position of the manipulated slider passes a position corresponding to the current value of the parameter, the manipulation of the slider is enabled to refresh the parameter value.

Then, the CPU 5 refreshes the screen of the small LCD 9*a* as in the case of the above-described step S16 (step S27). By this refresh, in the example of FIG. 2, without the transfer of the focus position f, the parameter value of the six column of the second row is changed from "50" to a value corresponding to the position of the manipulated slider, with the position indicated by the knob-shaped indicator also being changed.

Figure 10:
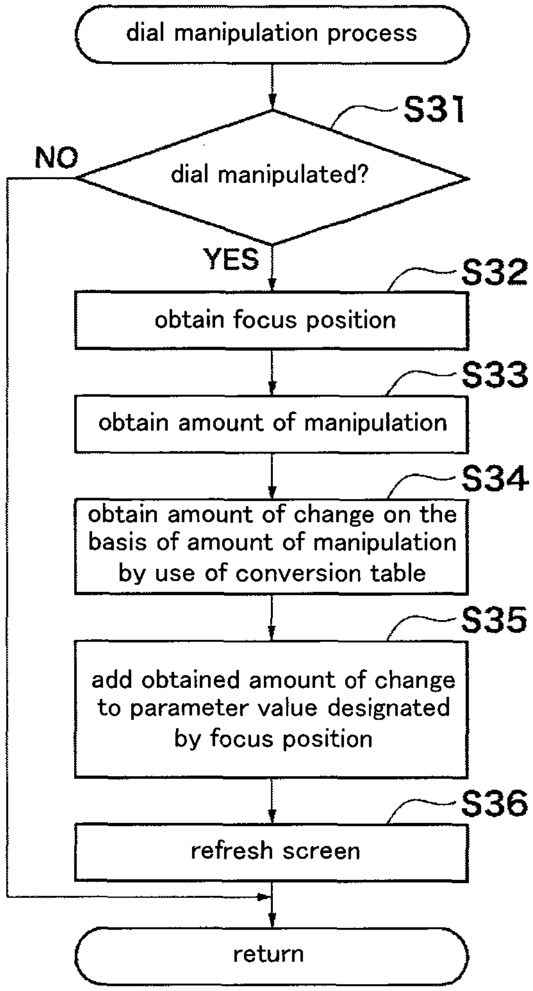
FIG. 10 is a flowchart indicating detailed steps of a dial manipulation process indicated in FIG. 7.

FIG. 10 is a flowchart indicating detailed steps of the dial manipulation process (5). In the dial manipulation process (5), firstly, the CPU 5 checks at all times whether the dial 2*a* has been manipulated (step S31). If the dial 2*a* has not been manipulated, the CPU 5 finishes the dial manipulation process (5) (step S31→return). If the dial 2*a* has been manipulated, the CPU 5 reads out a focus position stored in the focus position storing area to obtain the focus position (step S32).

Then, the CPU 5 obtains the amount of manipulation of the dial 2*a* (step S33). From the dial 2*a*, a numeric value corresponding to the position of the manipulated dial 2*a* specified on the basis of divisions around the dial made by a certain resolution, for example, is supplied to the CPU 5 through the detection circuit 4. By monitoring the numeric value corresponding to the position of the manipulated dial at certain intervals, the CPU 5 obtains the amount of manipulation of the dial 2*a*. The amount of manipulation can be either positive or negative. It is preferable that the amount of manipulation is considered as positive if the dial 2*a* is turned clockwise, whereas the amount of manipulation is considered as negative if the dial 2*a* is turned counterclockwise.

Then, the CPU 5 obtains, by use of a conversion table, the amount of change in the parameter value on the basis of the amount of manipulation obtained in step S33 (step S34). The conversion table used in step S34 is different from the conversion table used in step S25. The art for controlling a parameter value by use of the dial 2*a* is known. Furthermore, the features of the present invention do not lie in the method for controlling a parameter value by use of the dial 2*a*. Therefore, further description will be omitted, for a known art can be employed.

Then, the CPU 5 increases the value of the parameter designated by the focus position by the amount of change obtained in the above-described step S34 (step S35). The amount of change is provided with a positive or negative mark. As a matter of course, a negative increase results in a decrease by an absolute value of the amount of change. As mentioned in the explanation about step S14, each target parameter to be controlled can take only values falling within its certain range. However, an addition of the amount of change can exceed the maximum value or the minimum value of the parameter. In such a case, the parameter value is adjusted not to exceed the maximum or minimum value.

Then, the CPU 5 refreshes the screen of the small LCD 9*a* as in the case of the above-described step S16 (step S36). By this refresh, in the example of FIG. 2, the parameter value of the focus position f is changed from "50" to a value corresponding to the amount of manipulation of the dial 2*a*, with the position indicated by the knob-shaped indicator also being changed.

Figure 11:
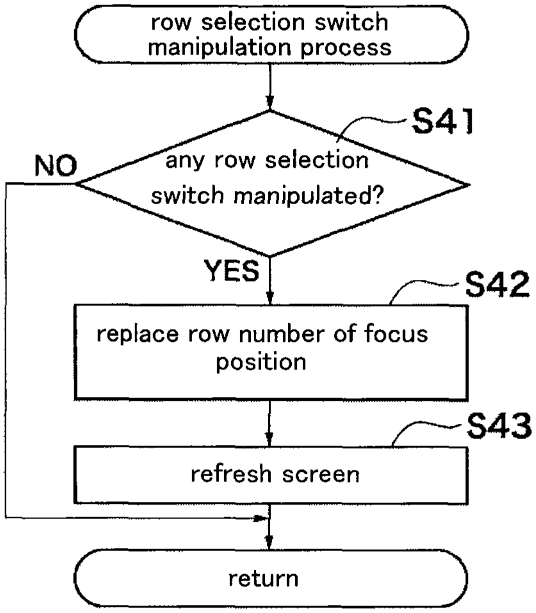
FIG. 11 is a flowchart indicating detailed steps of a row selection switch manipulation process indicated in FIG. 7.

FIG. 11 is a flowchart indicating detailed steps of the row selection switch manipulation process (6). In the row selection switch manipulation process (6), firstly, the CPU 5 checks at all times whether any one of the row selection switches 2*b* has been manipulated (step S41). If none of the row selection switches 2*b* have been manipulated, the CPU 5 finishes the row selection switch manipulation process (6) (step S41→return). If any of the row selection switches 2*b* has been manipulated, the CPU 5 reads out a focus position stored in the focus position storing area to replace the row number of the read focus position with the row number specified by the manipulated row selection switch (step S42). In the example of FIG. 4, in a case where the row selection switch indicated as "G" is depressed, for example, the third row is to be selected to select the parameters of the row, that is, the parameters of "OCTAVE". In addition, the focus position f is also to be transferred from the six column of the second row (the parameter of "PITCH BEND RANGE of RIGHT 1") to the six column of the third row (the parameter of "OCTAVE of RIGHT 1"). Then, the CPU 5 refreshes the screen of the small LCD 9*a* (step S43).

As for FIG. 7 again, in the musical tone signal generation process (7), if the detection circuit 3 supplies performance information to the CPU 5 in response to user's performance by use of the performance operator 1, the CPU 5 supplies the performance information to the tone generator 13 to instruct the tone generator 13 to generate musical tone signals. Alternatively, if the user starts the MIDI sequencer, selects song data whose automatic performance is desired by the user, and then instructs the start of the automatic performance, the performance information is supplied to the CPU 5 from the MIDI sequencer. Then, the CPU 5 supplies the performance information to the tone generator 13 to instruct the tone generator to generate musical tone signals. By this instruction, the tone generator 13 generates musical tone signals corresponding to the supplied performance information to supply the generated musical tone signals to the following digital signal processing circuit 14.

This embodiment is designed such that the user selects a row of parameters arranged in the matrix form by use of the row selection switches 2*b* and manipulates any of the operators (the increase/decrease switches 2*c* or the sliders 2*d*) correlated with the columns of the parameters to control the value of a parameter designated by the column correlated with the manipulated operator and the selected row in accordance with the user's manipulation. However, this embodiment may be modified to reverse the rows and the columns. That is, this embodiment may be designed such that the user selects a column of parameters with column selection switches and manipulates any of operators correlated with the rows of the parameters to control the value of a parameter designated by the row correlated with the manipulated operator and the selected column in accordance with the manipulation.

Furthermore, this embodiment is designed such that the parameters are arranged (displayed) in the matrix form on the small LCD 9*a*. However, this embodiment is not limited to this manner. More specifically, this embodiment may be modified such that the parameters are printed in the matrix form on a panel with LEDs for indicating selected row and column being arranged around the matrix. Furthermore, instead of the LEDs indicative of the row and column, 7-segment LEDs may be employed to indicate the row number and the column number. Alternatively, LEDs may be arranged in the matrix form.

Furthermore, although this embodiment is designed such that the parameters are arranged in the matrix form, this embodiment is not limited to this manner. That is, this embodiment may be modified such that the parameters are arranged on one row or one column. In a case where the parameters are arranged on one row, the row selection switches 2*b* are not necessary. In a case where the parameters are arranged on one column, the row selection switches 2*b* are replaced with operators for controlling value of the respective parameters (e.g., increase/decrease switches 2*c* and sliders 2*d*) so that the operators are correlated with the respective rows.

In this embodiment, any mention is not particularly made of the types of parameters controlled by the sliders 2*d*. Basically, that is, any type of parameter can be employed. However, at least some of the sliders 2*d* may be assigned parameters which are related to each other so that the some sliders are used in order to control the respective values of the parameters. This modification enables the user to visually recognize the rough shape of the controlled parameter values on the basis of the position of the manipulated sliders, supporting user's manipulation of controlling the parameter values. For example, in a case where partial envelopes obtained by dividing a whole envelope of one channel into several parts are employed as the parameters which are related to each other, the respective positions of the manipulated sliders indicate the rough shape of the envelope. If the user is not satisfied with such rough control, therefore, the user is allowed to make fine adjustments by use of the increase/decrease switches correlated with the some sliders. The other examples of the parameters related to each other include volume for each channel.

Furthermore, this embodiment is designed such that the control of each parameter value is made through the pointer indicative of the position of the register in which the parameter value is actually set. However, this embodiment is not limited to this manner. That is, the parameter value may be directly set in its corresponding register. In this case, the focus position is to indicate, not the position of the corresponding pointer stored in the pointer storing area, but the register of the corresponding pointer directly such as the name of the parameter.

It goes without saying that the object of the present invention can be achieved by a manner in which a storage medium which stores program codes of software which realizes the functions of the above-described embodiment is supplied to a system or an apparatus so that the system or a computer (or a CPU or an MPU) included in the apparatus reads out and carries out the program codes stored in the storage medium. In this modification, the program codes themselves read out from the storage medium realize the new functions of the present invention, with the program codes and the storage medium which stores the program codes forming the present invention.

As the storage medium for supplying the program codes, a flexible disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, a ROM or the like can be employed. Alternatively, the program codes may be supplied by a server computer via a communications network.

Furthermore, it is needless to say that the present invention includes not only the case in which the functions of the above-described embodiment are realized by executing the program codes read out by the computer but also a case in which an OS or the like which operates on a computer executes part of the actual processes or all the processes in accordance with the instructions made by the program codes so that the functions of the embodiment are realized by the processes.

Furthermore, it goes without saying that the present invention also includes a case in which the program codes read out from the storage medium are written on a functional expansion board inserted into a computer or a memory provided for a functional expansion unit connected to a computer, so that a CPU or the like provided for the functional expansion board or the functional expansion unit executes part of the actual processes or all the processes in accordance with the instructions made by the program codes to realize the functions of the embodiment by the processes.

What is claimed is:

1. A parameter setting apparatus comprising:

a storage device storing a plurality of parameters for controlling multimedia data, wherein at least some of the parameters are related to each other;

a plurality of first physical operators respectively correlated with the stored parameters;

a plurality of second physical operators respectively correlated also with the stored parameters, each of the second physical operators being manipulable by a user differently from the first physical operators;

a first parameter changing device that changes, in response to manipulation of one of the first physical operators, a value of a first parameter among the stored parameters correlated with the manipulated one first physical operator by a smallest unit;

a second parameter changing device that changes, in response to manipulation of one of the second physical operators, the value of the same first parameter correlated with the manipulated one first physical operator in accordance with the manipulation of the one second physical operator;

a display device that displays the stored parameters in a matrix form, wherein the respective first physical operators and the respective second physical operators are correlated with a plurality of columns of the parameters and a plurality of rows of the parameters displayed in the matrix form; and a selecting device that selects one of the columns of the parameters or one of the rows of the parameters displayed in the matrix form, wherein the selecting device includes a plurality of physical selecting switches each arranged in association with the display device for selecting one of the columns or one of the rows, and the first and second physical operators each arranged in association with the display device for selecting one of the other of the columns or rows, wherein the first parameter changing device changes, in response to manipulation of one of the first physical operators, a value of a second parameter, among the stored parameters, that is correlated with the manipulated one first physical operator, based on the selected one column or row, and wherein the second parameter changing device changes, in response to manipulation of one of the second physical operators, the value of the same second parameter that is correlated with the manipulated one first physical operator, based on the selected one column or row.

2. A parameter setting apparatus according to claim 1, wherein the first physical operators are physical switches, each that increase or decreases the value of the correlated parameter by a smallest unit.

3. A parameter setting apparatus according to claim 2, wherein each of the second physical operators are physical sliders that sets the value of the correlated parameter corresponding to a position of the respective manipulated second physical operator within a predetermined range.

4. A parameter setting apparatus according to claim 1, further comprising a nonlinear converting device that nonlinearly converts a value indicative of a position of at least one of the second physical operators to a value of the respective parameter.

5. A parameter setting apparatus according to claim 1, wherein:

the parameter setting apparatus is part of an electronic musical instrument, and the parameters are used for generating a musical tone.

6. A non-transitory computer-readable storage medium storing a computer program for controlling a parameter setting apparatus including: a storage device storing a plurality of parameters for controlling multimedia data, wherein at least some of the parameters are related to each other; a plurality of first physical operators respectively correlated with the stored parameters; a plurality of second physical operators respectively correlated also with the stored parameters, each of the second physical operators being manipulable by a user differently from the first physical operators; a display device that displays the stored parameters in a matrix form; and a selecting device, the computer program being executable by the parameter setting apparatus for causing the parameter setting apparatus to execute:

a first parameter changing task that changes, in response to manipulation of one of the first physical operators, a value of a first parameter among the stored parameters correlated with the manipulated one first physical operator by a smallest unit;

a second parameter changing task that changes, in response to manipulation of one of the second physical operators, the value of the same first parameter correlated with the manipulated one first physical operator in accordance with the manipulation of the one second physical operator, a correlating task that correlates the respective first physical operators and the respective second physical operators with a plurality of columns of the parameters and a plurality of rows of the parameters displayed in the matrix form, a selecting task that enables the selecting device to select one of the columns of the parameter or one of the rows of the parameters displayed in the matrix form, wherein the selecting device includes a plurality of physical selecting switches each arranged in association with the display device for selecting one of the columns or one of the rows, and the first and second physical operators each arranged in association with the display device for selecting one of the other of the columns or rows, wherein the first parameter changing task changes, in response to manipulation of one of the first physical operators, a value of a second parameter, among the stored parameters, that is correlated with the manipulated one first physical operator, based on the selected one column or row, and wherein the second parameter changing task changes, in response to manipulation of one of the second physical operators, the value of the same second parameter that is correlated with the manipulated one first physical operator, based on the selected one column or row.

7. A parameter setting apparatus-comprising:

a storage device storing a plurality of parameters for controlling multimedia data;

a plurality of first physical operators respectively correlated with the stored parameters;

a plurality of second physical operators respectively correlated also with the stored parameters, each of the second physical operators being manipulable by a user differently from the first physical operators;

a third physical operator for changing a value of a parameter placed on a focus position, the parameter being included in the stored parameters;

a first parameter changing device that changes, in response to manipulation of one of the first physical operators, a value of a first parameter among the stored parameters correlated with the manipulated one first physical operator in accordance with the manipulation of the one first physical operator, while transferring the focus position to the first parameter correlated with the manipulated one first physical operator; and a second parameter changing device that changes, in response to manipulation of one of the second physical operators, the value of the same first parameter correlated with the manipulated one first physical operator in accordance with the manipulation of the one second physical operator without transferring the focus position; and a third parameter changing device that changes, in response to manipulation of the third physical operator, the value of the same first parameter placed on the focus position in accordance with the manipulation of the third physical operator;

a display device that displays the stored parameters in a matrix form, wherein the respective first physical operators and the respective second physical operators are correlated with a plurality of columns of the parameters and a plurality of rows of the parameters displayed in the matrix form; and a selecting device that selects one of the columns of the parameters or one of the rows of the parameters displayed in the matrix form, wherein the selecting device includes a plurality of physical selecting switches each arranged in association with the display device for selecting one of the columns or one of the rows, and the first and second physical operators each arranged in association with the display device for selecting one of the other of the columns or rows, wherein the first parameter changing device changes, in response to manipulation of one of the first physical operators, a value of a second parameter, among the stored parameters, that is correlated with the manipulated one first physical operator, based on the selected one column or row, and wherein the second parameter changing device changes, in response to manipulation of one of the second physical operators, the value of the same second parameter that is correlated with the manipulated one first physical operator, based on the selected one column or row.

8. A parameter setting apparatus according to claim 7, wherein the first physical operators are physical switches each that increase or decrease the value of the correlated parameter by a smallest unit.

9. A parameter setting apparatus according to claim 8, wherein each of the second physical operators are physical sliders that sets the value of the correlated parameter corresponding to a position of the respective manipulated second physical operator within a predetermined range.

10. A parameter setting apparatus according to claim 7, further comprising a nonlinear converting device that nonlinearly converts a value indicative of a position of at least one of the second physical operators to a value of the respective parameter.

11. A parameter setting apparatus according to claim 7, wherein the third physical operator is a physical dial operator.

12. A parameter setting apparatus according to claim 7, wherein:

the parameter setting apparatus is part of an electronic musical instrument, and the parameters are used for generating a musical tone.

13. A non-transitory computer-readable storage medium storing a computer program for controlling a parameter setting apparatus including: a storage device storing a plurality of parameters for controlling multimedia data; a plurality of first physical operators respectively correlated with the stored parameters; a plurality of second operators respectively correlated also with the stored parameters, each of the second physical operators being manipulable by a user differently from the first physical operators; and a display device that displays the stored parameters in a matrix form; a third physical operator for changing a value of a parameter placed on a focus position, the parameter being included in the stored parameters; a display device that displays the stored parameters in a matrix form; and a selecting device, the computer program being executable by the parameter setting apparatus for causing the parameter setting apparatus to execute:

a first parameter changing task that changes, in response to manipulation of one of the first physical operators, a value of a first parameter among the stored parameters correlated with the manipulated one first physical operator in accordance with the manipulation of the one first physical operator, while transferring the focus position to the first parameter correlated with the manipulated one first physical operator;

a second parameter changing task that changes, in response to manipulation of one of the second physical operators, the value of the same first parameter correlated with the manipulated one first physical operator in accordance with the manipulation of the one second physical operator without transferring the focus position;

a third parameter changing task that changes, in response to manipulation of the third physical operator, the value of the same first parameter placed on the focus position in accordance with the manipulation of the third physical operator, a correlating task that correlates the respective first physical operators and the respective second physical operators with a plurality of columns of the parameters and a plurality of rows of the parameters displayed in the matrix form, a selecting task that enables the selecting device to select one of the columns of the parameter or one of the rows of the parameters displayed in the matrix form, wherein the selecting device includes a plurality of physical selecting switches each arranged in association with the display device for selecting at least one of the columns or one of the rows, and the first and second physical operators each arranged in association with the display device for selecting one of the other of the columns or rows, wherein the first parameter changing task changes, in response to manipulation of one of the first physical operators, a value of a second parameter, among the stored parameters, that is correlated with the manipulated one first physical operator, based on the selected one column or row, and wherein the second parameter changing task changes, in response to manipulation of one of the second physical operators, the value of the same second parameter that is correlated with the manipulated one first physical operator, based on the selected one column or row.

* * * * *